July 16, 1929.  C. A. ZAHRNDT  1,721,196

SPRING CONSTRUCTION

Filed Oct. 1, 1926

INVENTOR.
Clarence A. Zahrndt

BY *Clayton E. Wyrick*

ATTORNEY.

Patented July 16, 1929.

1,721,196

UNITED STATES PATENT OFFICE.

CLARENCE A. ZAHRNDT, OF DETROIT, MICHIGAN.

SPRING CONSTRUCTION.

Application filed October 1, 1926. Serial No. 138,941.

This invention relates to spring constructions, and relates particularly to coiled spring constructions.

An object of the invention is to provide for maintaining selective expansions of a coiled spring by means of a rod or wire passing through the coils of the spring.

A still further object is to provide a novel means for utilizing one end of a coiled spring to secure to an anchorage member for said spring one end of an expander passing through the coils of said springs.

These and various other objects the invention attains by the construction hereinafter described and illustrated in the accompanying drawings, wherein.

Figure 1:
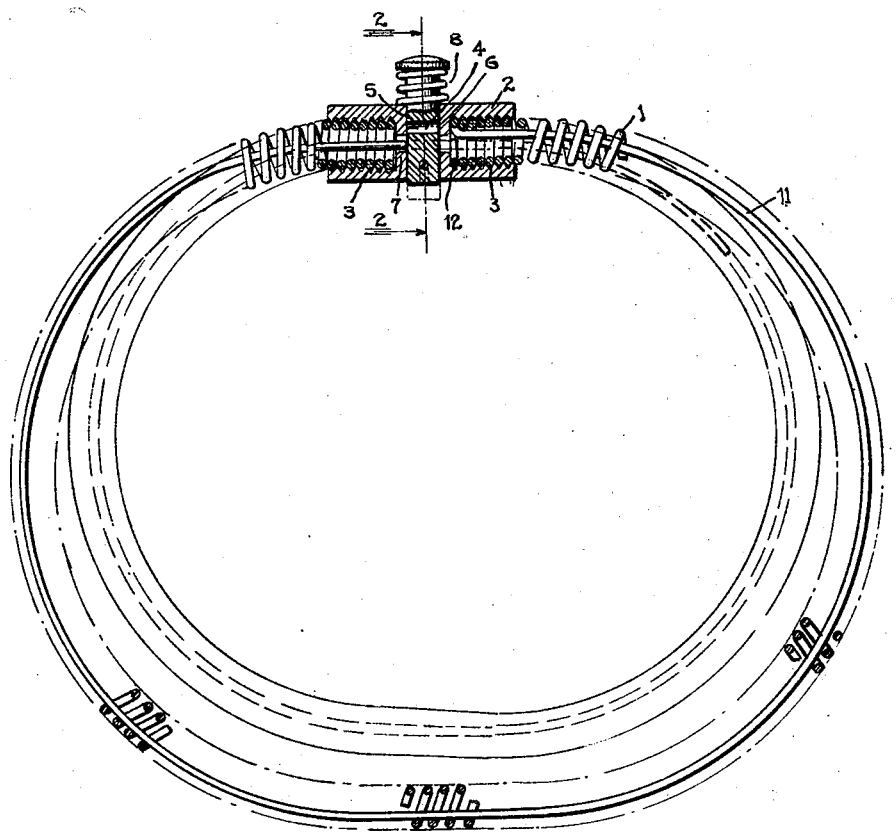
Figure 1 is a view in side elevation and partial section of one form of the improved spring construction indicating in full lines and dash lines two selective positions of expansion of the spring.
Figure 3:
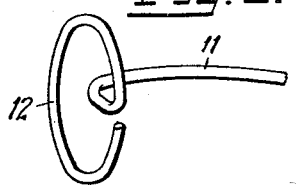
Figure 3 is a perspective view of one end of an expander showing the formation upon said end of a coil adapted to be threaded into a tapped socket.
Figure 2:
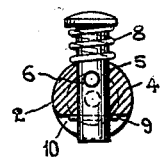
Figure 2 is a cross-section view of a coupling connecting the ends of the spring, said section being taken on line 2—2 of Figure 1.

In these views the reference character 1 designates a coiled spring having the form of a ring with its ends coupled together. The coupling member 2 for said ends is formed with opposite tapped sockets 3 and the ends of the spring 1 are engaged in said sockets, the convolutions of said ends functioning as thread elements to engage the screw threads of said sockets.

Between the sockets 3 the coupling member 2 is transversely bored as indicated at 4 to slidably receive the plunger 5, and said plunger has an opening 6 through its mid-portion adapted in a depressed position of the plunger to register with openings 7 connecting the bore 4 with said sockets. A coiled spring 8 compressed between the headed upper end of said plunger and the member 2 holds the plunger normally in a raised position in which the openings 6 and 7 are out of registration, and a pin 9 projecting from the lower end of the plunger engages in a notch 10 transversely formed in the bottom portion of said coupling member to limit the projecting movement of the plunger.

Through the coils of the spring 1 there is extended a rod or wire 11 one end of which is fashioned to form one or more coils 12 proportioned to be screwed into one of the sockets 3 in advance of that end portion of the spring 1 which is also screwed into said socket. Thus the spring 1 in engaging said socket forms a means for holding said end portion of the wire 11 against the end wall of said socket. The other end portion of the wire 11 enters the socket 3 and when the plunger 5 is projected bears against said plunger as shown in full lines in Figure 1 maintaining a predetermined expansion of the spring 11. Upon a depression of the plunger 5 such as to register the openings 6 and 7, the contractive tendency of the spring will cause the free end portion of the wire 11 to immediately slide through the opening 6 and overlap the anchored end portion of said wire, the spring 1 now assuming the contracted position shown in dash lines in Figure 1.

The described construction has a particular application to use in connection with spare tire covers. That is to say it is common practice to arrange within a marginal hem of a spare tire cover a coiled spring for contracting the marginal portion of such a cover into an embracing relation with a spare tire.

Heretofore, however, it has been a troublesome matter to effect the necessary expansion of the coiled spring while the tire cover is being applied to a tire. The described construction permits the spring to be expanded before application of the tire cover to the tire and maintains the expansion while the tire cover is being applied. It is then necessary merely to slightly depress the plunger 5 to release the coiled spring and allow it to resume its normal state of contraction in which a tire is snugly embraced by the cover.

It will be noted that the member 2 not only couples together or connects the ends of the coiled spring 1, but further serves to couple the end portions of the flexible member 11.

From the foregoing it becomes evident that the device is simple and efficient and provides means which accomplish the objects described.

While it will be apparent that the illustrated embodiment of my invention, herein disclosed, is well calculated to adequately fulfill the object and advantages primarily stated, it is to be understood that the invention is susceptible to variation, modification and change within the spirit and scope of the subjoined claims.

Having thus described my invention, I claim:

1. The combination with a coiled spring, of an expander for said spring extending through the coils of the spring, and actuating means for said expander carried by the spring.

2. The combination with a coiled spring, of an expander therefor extending through the coils thereof and having one end substantially fixed with respect to the corresponding end of said spring, and means carried by the spring for variably fixing the other end portion of said expander with respect to the other end of said spring.

3. The combination with a coiled spring of a coupling connecting the ends of said spring, an expander extending through the coils of said spring having one of its ends secured in a substantially fixed relation to said coupling and the other slidably engaging the coupling, and means carried by said coupling for selectively positioning the sliding end of the expander with respect to the coupling to establish selective expansions of the spring.

4. The combination with a coiled spring of a coupling member connecting the ends of said spring, an expander extending through the coils of said spring, and having one of its ends attached in a substantially fixed relation to the coupling member and the other slidably engaging the coupling, and a member movably carried by the coupling forming an abutment for the sliding end of said expander in one position of said member to maintain an expanded condition of the spring, said expander being free to slide through the coupling in another position of said member to permit contraction of the spring.

5. The combination with a coiled spring, of a coupling member connecting the ends of said spring, an expander extending through the coils of said spring having one of its ends secured in a substantially fixed relation to the coupling member, a plunger slidable in said coupling member in a substantially transverse relation to the axes of said spring forming an abutment in one limiting position for the other end of said expander, said plunger having an opening registrable in another position with said expander to permit sliding of the expander through the coupling and accomplish a contraction of the spring.

6. The combination with a coiled spring, of a coupling member formed with sockets receiving the ends of said spring, an expander for said spring extending through the coils thereof, and having one of its ends anchored to the coupling member within one of said sockets, and having its other end portion slidable with respect to said coupling member, and means carried by said coupling member for establishing selective sliding positions of said expander relative to said member.

7. The combination with a coiled spring and an expander for said spring extending therethrough, of a member formed with a socket into which one end portion of said spring is threaded, the corresponding end portion of said expander forming a coil threaded into said socket in advance of said spring.

8. The combination with a coiled spring forming an annulus, of a flexible expander extending within said spring, and having one end free, means securing the other end of said expander to the spring, and means carried by the spring engageable with the free end portion of the expander to maintain an expansion of the spring.

9. The combination with a coiled spring forming an annulus, of a flexible expander extending within said spring and having one end free, means securing the other end of said expander to the spring, and a member carried by the spring and movable into and out of engagement with the free end portion of the expander and adapted when engaged with said end portion to maintain an expansion of the spring.

10. The combination with a coiled spring forming an annulus, of an expander for said spring extending through the coils thereof, a member carried by the spring and anchoring one extremity of said expander, and formed with an opening through which the other end portion of the expander is slidable, and means carried by said member and engageable by the free end portion of the expander to maintain an expansion of the spring.

11. The combination with an elongated, expansible member, of a coupling connecting the ends of said member, an elongated flexible expander associated with said expansible member and having one of its ends anchored to said coupling, and the other slidably engaging the coupling, and means carried by the coupling for selectively positioning the sliding end of the expander, with respect to the coupling to establish selective expansions of the expansible member.

12. The combination with a coiled spring forming an annulus, of an elongated flexible expander extending through the coils of said spring and having one end portion free, means permanently attaching the other end portion of said expander to the spring, and manually releasable means carried by the spring engageable with the free end portion of said expander to hold said portion fixed with respect to the spring and to thereby hold the spring expanded.

13. The combination with a coiled spring forming an annulus, of an elongated flexible expander extending through the coils of said spring and having a free end portion, means permanently attaching the other end portion of said expander to the spring, a member carried by the spring through which member the free end portion of the expander is slidable, and means carried by said member releasably engageable with the sliding end portion of the expander to fix said portion with respect to said member to thereby hold the spring expanded.

14. The combination with a coiled spring forming an annulus, of an elongated flexible expander extending through the coils of said spring and having a free end portion, means permanently attaching the other end portion of said expander to the spring, a member carried by the spring through which the free end portion of said expander is slidable, an element carried by said member releasably engageable with the said sliding end portion of the expander, to fix said end portion with respect to said member to hold said spring expanded, and means for yieldably holding said element in its position restraining sliding of the expander.

15. The combination with a coiled spring forming an annulus, of an elongated flexible expander extending through the coils of said spring and having a free end portion, means attaching the other end portion of said expander to the spring, a member interposed between coiled portions of the spring and carried by the spring and formed with an opening through which the other portion of said expander is slidable, and means carried by said member releasably engageable with the sliding end portion of the expander to restrain said portion from sliding.

16. The combination with a coiled spring of an elongated flexible expander extending through the coils of said spring and having a free end portion, means permanently attaching the other end portion of said expander to the spring, a member carried by the spring through which the free end portion of said expander is slidable, means carried by said member releasably engageable with the said sliding end portion of the expander to fix said portion with respect to said member to thereby hold said spring expanded.

17. The combination with a coiled spring of an elongated flexible expander extending through the coils of said spring and having a free end portion, means securing said expander at one point thereon fixedly to said spring, a member carried by the spring through which the other end portion of said expander is slidable, an element carried by said member releasably engageable with the free end portion of the expander, to restrain said portion from sliding and to thereby hold said spring expanded, and means carried by said member yieldably maintaining said element in its position exercising restraint upon the expander.

18. The combination with a coil spring, of means carried by and extending the full length of said spring for establishing and maintaining an expansion of the spring.

19. The combination with a coiled spring forming an annulus, of a flexible expander extending circumferentially of said annulus and anchored at one end to the spring, and means carried by the spring and engageable by the opposite end portion of said expander for releasably maintaining expansion of the spring.

20. In a device of the character described, the combination with an elongated flexible member forming an annulus, of a coupling member slideably engaged by one end portion of said flexible member, means securing the other end of said flexible member to said coupling member, and an element carried by said coupling member engaging said sliding end portion of the flexible member, and movable transversely to said end portion to maintain selective sliding positions thereof, and corresponding selective expansions of said annulus.

21. In a device of the character described, the combination with an elongated flexible member forming an annulus, of a coupling member, means securing one end of said flexible member to said coupling member, and an element slidable in said coupling member transversely to said flexible member and formed with an opening for slideably receiving the other end portion of the flexible member and adapted to maintain selective positions of said sliding end portion and corresponding selective expansions of said annulus.

22. In a device of the character described, the combination with an elongated flexible member forming an annulus, of a coupling member, means attaching one end of said annulus to said coupling member, and an element slideable in said coupling member transversely to the flexible member and formed with an opening to receive the other end portion of the flexible member, said element being adapted by its sliding travel to maintain selective positions of the sliding end of said flexible member and corresponding selective expansions of said annulus, and a spring carried by said coupling member urging said sliding element to one limiting position thereof.

23. In a device of the character described, the combination with an elongated flexible member forming an annulus, of a coupling member having sockets formed in opposite ends thereof and having an aperture connecting said sockets, means securing one extremity of said flexible member in one of said sockets, the other end portion of said flexible member passing freely through the other of said sockets, and an element transversely slideable in said flexible member formed with an opening registrable by sliding travel of said element, with the opening connecting said sockets to provide for variable expansions of said flexible member.

24. In a device of the character described, the combination with an elongated flexible member forming an annulus, of a coupling member slideably engaged by one end portion of said flexible member, means for securing the other end of said flexible member to said coupling member, means carried by the coupling member for maintaining selective expansions of the annulus formed by said flexible member, and spring means contractively acting upon said annulus.

25. In a device of the character described, the combination with an elongated flexible member forming an annulus, of a coupling member slideably engaged by one end portion of said flexible member, means for securing the other end portion of the flexible member to said coupling member, means carried by the coupling member for establishing selective expansions of the annulus formed by said flexible member, and a spring attached at one extremity to said coupling member and contractively acting upon said annulus.

26. In a device of the character described, the combination with an elongated flexible member forming an annulus, of a coupling member slideably engaged by one end portion of said flexible member, means for securing the other end portion of said flexible member to said coupling member, an element slideable in the coupling member transversely of said flexible member for maintaining selective expansions of the annulus formed by said flexible member and spring means contractively acting upon said flexible member.

27. In a device of the character described, the combination with an elongated flexible member forming an arc greater than a semi-circle, of means for anchoring one end of said member, means slideably engaged by the other end portion of said member adapted to establish differential expansions of said member and spring means contractively acting upon said member.

28. In a device of the character described, the combination with an elongated flexible member forming an arc greater than a semi-circle, of means for anchoring one end of said member, and a member apertured to slidingly receive the other end portion of said flexible member, movable transversely of said end portion, and means for establishing differential sliding positions of said end portion through the movement of said apertured member.

29. In a device of the character described, a tire cover; a coiled spring having its ends connected together to form a ring lodged in a hem of the cover; a rod housed within the spring ring having one end only attached to the spring; means adapted to engage said rod, whereby upon distending the spring to open the cover the spring may be held distended by the rod while engaged by said means until manually released.

In witness whereof I hereunto set my hand.

CLARENCE A. ZAHRNDT.